(12) United States Patent
Shen et al.

(10) Patent No.: US 11,252,267 B2
(45) Date of Patent: *Feb. 15, 2022

(54) CONTENT STREAM INTEGRITY AND REDUNDANCY SYSTEM

(71) Applicant: Verizon Patent and Licensing Inc., Basking Ridge, NJ (US)

(72) Inventors: Kevin Shen, Sunnyvale, CA (US); Suri B. Medapati, San Jose, CA (US); Walter John Schmidt, Dallas, TX (US); Sankar Subramanian, Ossining, NY (US); James F. Dimattia, Easton, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,910

(22) Filed: Mar. 18, 2021

(65) Prior Publication Data

US 2021/0211528 A1    Jul. 8, 2021

Related U.S. Application Data

(63) Continuation of application No. 16/669,814, filed on Oct. 31, 2019, now Pat. No. 10,965,795, which is a (Continued)

(51) Int. Cl.
*H04L 29/14* (2006.01)
*G06F 11/20* (2006.01)
*G06F 11/30* (2006.01)
*G06F 11/34* (2006.01)
*G06F 11/10* (2006.01)

(52) U.S. Cl.
CPC .......... *H04L 69/40* (2013.01); *G06F 11/2033* (2013.01); *G06F 11/3006* (2013.01); *G06F 11/3433* (2013.01); *G06F 11/1048* (2013.01)

(58) Field of Classification Search
CPC ... G06F 11/1048; G06F 11/2033; H04L 69/40
See application file for complete search history.

(56) References Cited

U.S. PATENT DOCUMENTS 6,934,875 B2    8/2005   Kashyap
8,300,646 B2   10/2012   Cuthbert et al.
(Continued)

*Primary Examiner* — Joseph R Kudirka

(57) ABSTRACT

A system can include one or more content distribution sites to provide content to one or more content satellite offices for delivery toward a set of destination devices for display. A content distribution site, of the one or more content distribution sites, can include one or more streamer devices. The one or more streamer devices can be associated with a single spoofed Internet protocol (IP) address. The spoofed IP address can facilitate failover among the one or more streamer devices. The one or more streamer devices can be configured to provide the content toward the set of destination devices using multicast with forward error correction (FEC). A content satellite office, of the one or more content satellite offices, can be configured to subscribe to a multicast group associated with the one or more streamer devices. The multicast group can be associated with the spoofed IP address to facilitate the failover among the one or more streamer devices.

20 Claims, 6 Drawing Sheets

Related U.S. Application Data continuation of application No. 15/847,438, filed on Dec. 19, 2017, now Pat. No. 10,491,723.

(56) References Cited

U.S. PATENT DOCUMENTS

| | | | |
|---|---|---|---|
| 8,498,204 B2* | 7/2013 | Toyoda | H04L 1/20 370/226 |
| 8,848,508 B2 | 9/2014 | Moreno et al. | |

* cited by examiner

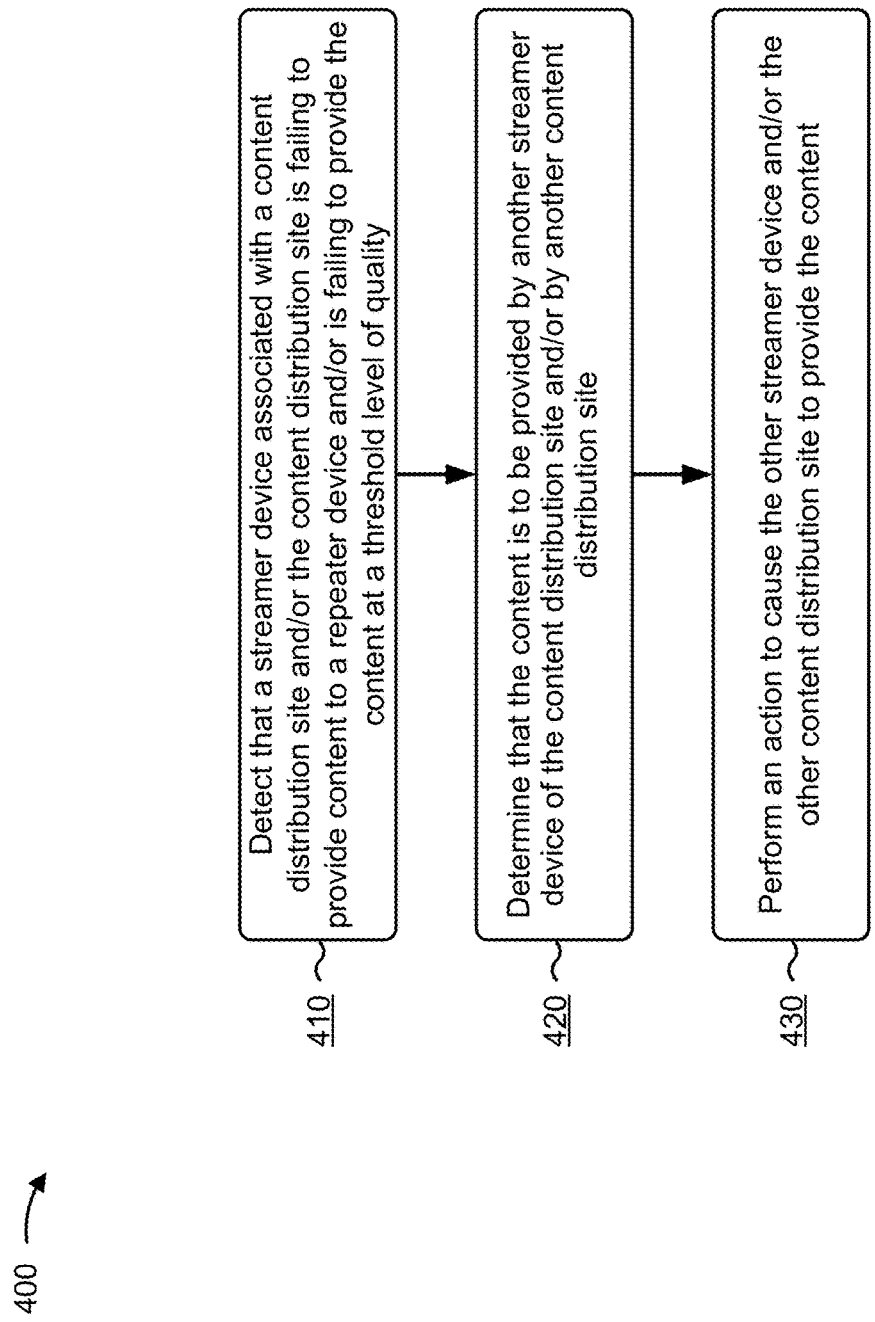

CONTENT STREAM INTEGRITY AND REDUNDANCY SYSTEM

RELATED APPLICATION

This application is a continuation of U.S. patent application Ser. No. 16/669,814, entitled "CONTENT STREAM INTEGRITY AND REDUNDANCY SYSTEM," filed Oct. 31, 2019 (now U.S. Pat. No. 10,965,795), which is a continuation of U.S. patent application Ser. No. 15/847,438, entitled "CONTENT STREAM INTEGRITY AND REDUNDANCY SYSTEM," filed Dec. 19, 2017 (now U.S. Pat. No. 10,491,723), which are incorporated herein by reference in their entirety.

BACKGROUND

In computer networking, multicast is a form of communication where at least one sending device simultaneously addresses a data transmission to a group of different destination devices. Forward error correction (FEC) is a technique used for controlling errors in data transmission. In FEC, a sending device encodes a message in a redundant way, such as by using an error correcting code (ECC), which allows a receiving device to correct errors in the message without having to request retransmission of the message.

BRIEF DESCRIPTION OF THE DRAWINGS

FIG. 4 is a flow chart of an example process related to a content stream integrity and redundancy system.

DETAILED DESCRIPTION OF PREFERRED EMBODIMENTS

The following detailed description of example implementations refers to the accompanying drawings. The same reference numbers in different drawings can identify the same or similar elements.

Some content delivery techniques include using transmission control protocol (TCP) to provide content from a source of the content to a destination of the content. With this technique, the source of the content can retry providing content to the destination in the event of a loss of data related to the content when the content is provided to the destination. This causes significant latency when providing content to a destination. In addition, if the loss of data is the result of an error with the source, the destination, and/or a network that connects the source and the destination, then re-providing the data might not fix the loss of data and can further increase latency. Further, these techniques can lack automatic redundancy where a destination receives content from another source when the original source experiences an error that negatively impacts a capability of the original source to provide the content.

Some implementations, described herein, provide a system (e.g., a content delivery system, a data center, etc.) related to providing content to a destination that uses multicast with forward error correction when providing the content to a destination. In addition, the system uses Internet protocol (IP) spoofing for multiple sources of content so that a source of the content can fail over to another source automatically. This reduces or eliminates a need for a source of content to re-provide content when there is a loss of data related to the content, thereby conserving processing resources of the source of the content. In addition, this facilitates the destination to generate lost data, thereby reducing latency associated with replacing lost data for the content. Further, this facilitates automatic and/or quick failover when a source of content loses the capability to provide content, thereby reducing latency related to failover, and/or conserving processing resources that would otherwise be consumed configuring a destination to receive content from a different source after a failover. Further, this conserves network resources by not repeatedly sending lost data that will also be lost.

Figure 1:
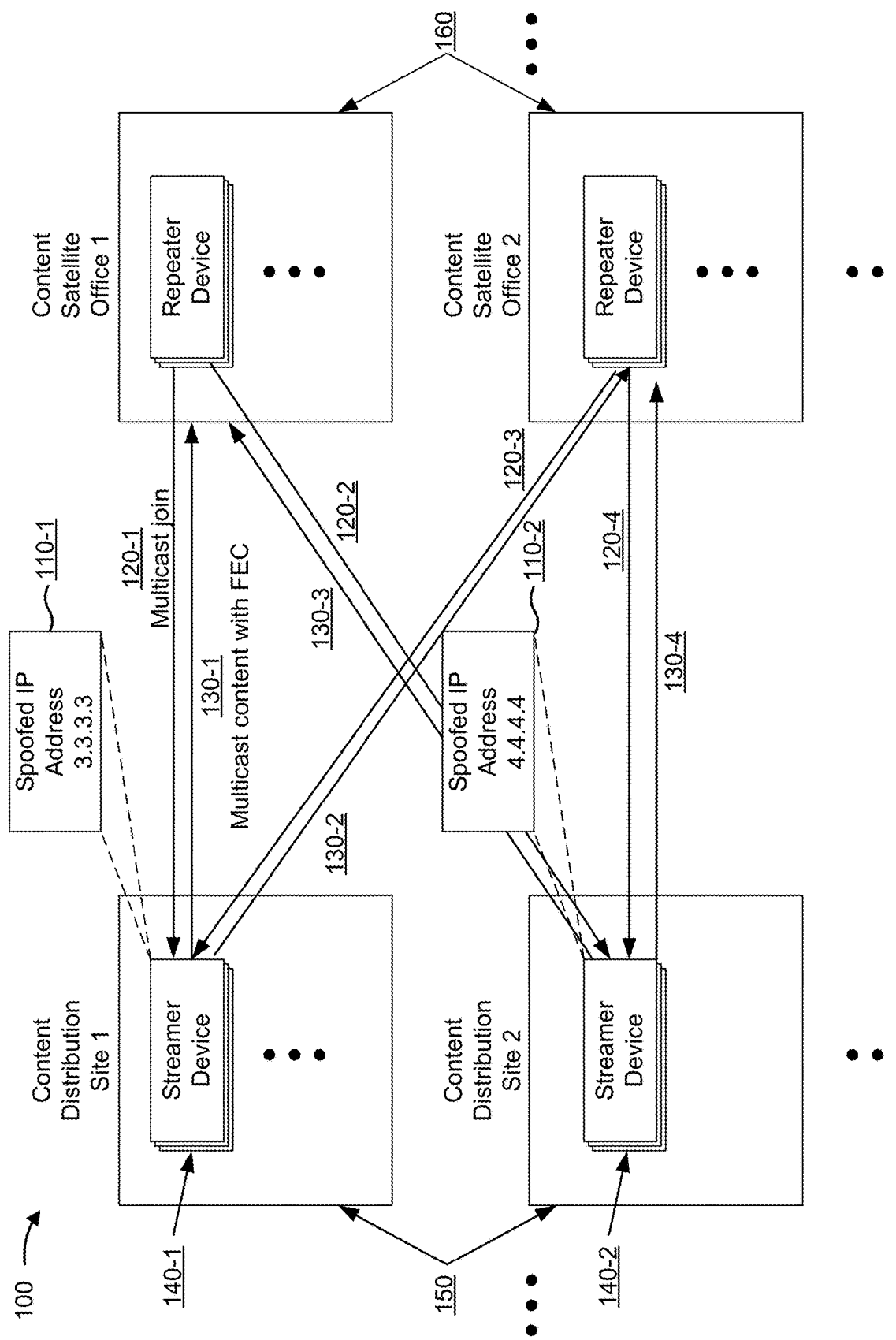
FIG. 1 is a diagram of an overview of an example implementation described herein.

FIG. 1 is a diagram of an overview of an example implementation 100 described herein. As shown in FIG. 1, example implementation 100 includes multiple content distribution sites (e.g., shown as content distribution site 1 and content distribution site 2) and multiple content satellite offices (e.g., shown as content satellite office 1 and content satellite office 2). A content distribution site, of the multiple content distribution sites, can include multiple streamer devices. A content satellite office, of the multiple content satellite offices, can have multiple repeater devices.

As further shown in FIG. 1, and as shown by reference numbers 110-1 and 110-2, streamer devices associated with a content distribution site can have the same spoofed Internet protocol (IP) address that the streamer devices include in multicast packets destined for other devices (e.g., the repeater devices). For example, the streamer devices associated with content distribution site 1 can have a spoofed IP address of 3.3.3.3 that content distribution site 1 includes in multicast packets destined for the repeater devices of content satellite offices 1 and 2, and the streamer devices associated with content distribution site 2 can have a spoofed IP address of 4.4.4.4 that content distribution site 2 includes in multicast packets destined for the repeater devices of content satellite offices 1 and 2. Based on having the same spoofed IP address for streamer devices associated with a content distribution site, the repeater devices can receive content from any of the streamer devices associated with the content distribution site without having to be reconfigured or updated to use a new IP address when a streamer device from which the repeater device is receiving content is no longer capable of providing content. This facilitates automatic failover to another streamer device while reducing interruptions to a stream of content, conserves processing resources that would otherwise be consumed configuring a repeater device to receive content from a different streamer device, reduces latency for the receiver device in receiving the content, and/or the like.

As further shown in FIG. 1, and as shown by reference numbers 120-1 through 120-4, the repeater devices can send multicast join requests to the streamer devices to subscribe to the content provided by the streamer devices (e.g., to subscribe to a multicast group associated with a group of streamer devices, with a spoofed IP address, etc.). The multicast join requests can be associated with the spoofed IP addresses of the streamer devices associated with content distribution sites 1 and 2. In this way, the repeater devices can receive content from any of the streamer devices associated with content distribution sites 1 and 2. This facilitates automatic failover from a first streamer device to a second streamer device when the first streamer device is no longer capable of providing content or is providing content that does not satisfy a threshold level of quality (e.g., a threshold bit rate, a threshold resolution, etc.). In addition, a repeater device can store information identifying content to be received from the streamer devices (e.g., content destined for the repeater device). In this way, the repeater device can selectively drop content from the streamer devices that is not destined for the repeater device despite having subscribed to multiple streamer devices.

As shown by reference numbers 130-1 through 130-4, the streamer devices can provide multicast content with forward error correction (FEC) to the repeater devices that have subscribed to the spoofed IP addresses. Based on the streamer devices providing content with FEC, the repeater devices can generate data related to the content that is lost during transmission from the streamer devices to the repeater devices, thereby reducing or eliminating a need for the streamer devices to resend the content in the event of lost data. This conserves processing resources of the streamer devices by reducing or eliminating a need for the streamer devices to re-send lost data, conserves network resources, such as bandwidth, between the streamer devices and the repeater devices by reducing or eliminating a need for the streamer devices to re-send lost data, and/or reduces or eliminates latency that could occur as a result of having to request lost data to replace the lost data.

As further shown in FIG. 1, and as shown by reference numbers 140-1 and 140-2, because content distribution sites 1 and 2 have multiple streamer devices that have the same spoofed IP address, any streamer device associated with a content distribution site can automatically fail over to another streamer device in the content distribution site without having to reconfigure repeater devices to receive data from a streamer device that uses a different IP address (e.g., because the repeater devices have subscribed to all the streamer devices that use the spoofed IP address). In addition, the repeater devices do not need to send a new multicast join request, thereby conserving network resources and processing and communication resources of the repeater devices relative to sending a new multicast join request. In this way, providing multiple streamer devices having the same spoofed IP address facilitates automatic failover, reduces latency associated with failover, and/or the like.

As further shown in FIG. 1, and as shown by reference number 150, there are multiple content distribution sites (e.g., content distribution sites 1 and 2). This facilitates failover (e.g., automatic failover or manual failover) among the multiple content distribution sites. For example, content distribution site 1 can automatically fail over to content distribution site 2 if content distribution site 1 is no longer capable of providing content to the repeater devices associated with content satellite offices 1 and 2, experiences an error in processing, and/or the like. Furthermore, because the repeater devices of content satellite offices 1 and 2 have subscribed to the spoofed IP addresses of the streamer devices of both content distribution sites 1 and 2, content distribution site 1 can fail over to content distribution site 2 without a need for the repeater devices to be reconfigured to receive the content from a new IP address. In this way, providing multiple content distribution sites, each having streamer devices with spoofed IP addresses to which the repeater devices can subscribe, facilitates failover, reduces latency associated with failover, conserves processing resources related to reconfiguring a repeater device to receive content from a streamer device with a new IP address, and/or the like.

As further shown in FIG. 1, and as shown by reference number 160, there are multiple content satellite offices (e.g., shown as content satellite offices 1 and 2) that enable multiple paths for providing content toward a destination (e.g., a home, a customer edge device, a user device, etc.). For example, if content satellite office 1 fails, streamer devices of the content distribution sites can be reconfigured to provide content to content satellite office 2. In this way, providing multiple content satellite offices facilitates multiple paths for content to a destination, facilitates redundancy in a system, and/or automatic failover, thereby improving a user experience by reducing interruptions in providing the content. Furthermore, providing multiple repeater devices within each content satellite office enables failover between the repeater devices, thereby reducing interruptions to providing content toward a destination. Furthermore, based on using multicast with IP spoofing, the failover is seamless, quick, and automatic, and does not require the repeater devices to be reconfigured to receive content from different streamer devices.

In this way, a system can provide multiple content distribution sites, multiple streamer devices with the same spoofed IP address associated with each respective content distribution site, multiple content satellite offices, and multiple repeater devices associated with each respective content satellite office. In addition, in this way, the system facilitates recovery of lost data via use of forward error correction. This facilitates automatic failover among streamer devices and/or content distribution sites via use of spoofed IP addresses and multicast transmissions of content. In addition, this reduces latency related to recovery of lost data via use of forward error correction. Further, this conserves processing resources related to recovery of lost data by reducing or eliminating a need to resend content that experienced a loss of data during transmission of the data.

As indicated above, FIG. 1 is provided merely as an example. Other examples are possible and can differ from what was described with regard to FIG. 1.

Figure 2:
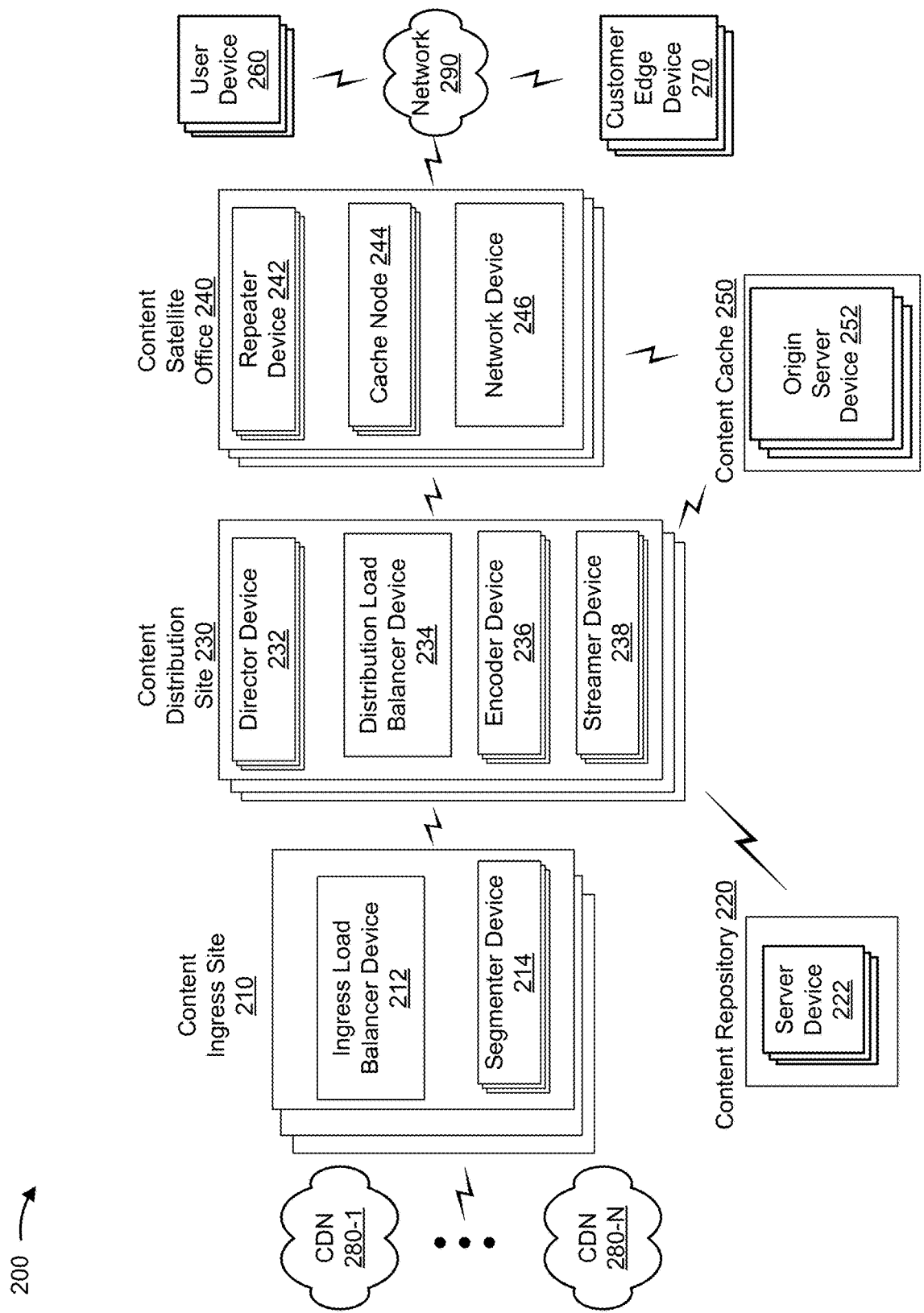
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a content ingress site 210 that includes an ingress load balancer device 212 and a set of segmenter devices 214 (referred to collectively as "segmenter devices 214" and individually as "segmenter device 214"). Additionally, or alternatively, environment 200 can include a content repository 220 that includes a set of server devices 222 (referred to collectively as "server devices 222" and individually as "server device 222"). Additionally, or alternatively, environment 200 can include a content distribution site 230 that includes a set of director devices 232 (referred to collectively as "director devices 232" and individually as "director device 232"), a distribution load balancer device 234, a set of encoder devices 236 (referred to collectively as "encoder devices 236" and individually as "encoder device 236"), and a set of streamer devices 238 (referred to collectively as "streamer devices 238" and individually as "streamer device 238"). Additionally, or alternatively, environment 200 can include a content satellite office 240 that includes a set of repeater devices 242 (referred to collectively as "repeater devices 242" and individually as "repeater device 242"), a set of cache nodes 244 (referred to collectively as "cache nodes 244" and individually as "cache node 244"), and a network device 246. Additionally, or alternatively, environment 200 can include a content cache 250 that includes a set of origin server devices 252 (referred to collectively as "origin server devices 252" and individually as "origin server device 252"). Additionally, or alternatively, environment 200 can include a set of user devices 260 (referred to collectively as "user devices 260" and individually as "user device 260"), a set of customer edge devices 270 (referred to collectively as "customer edge devices 270" and individually as "customer edge device 270"), content delivery networks (CDNs) 280-1 through 280-N (N≥1), and a network 290. Devices of environment 200 can interconnect via wired connections, wireless connections, or a combination of wired and wireless connections.

Content ingress site 210 includes one or more sites and/or systems capable of receiving, generating, storing, processing, and/or providing content from CDN 280 (e.g., content to be provided to user device 260 and/or customer edge device 270). For example, content ingress site 210 can include a headend, a cable television headend, a super headend (SHE), a market center headend, a video hub office (VHO), an antenna, a satellite dish, a data center, and/or the like. In some implementations, content ingress site 210 can receive content from CDN 280 that is to be provided to user device 260 and/or customer edge device 270. Additionally, or alternatively, content ingress site 210 can process content received from CDN 280 into portions (e.g., prior to providing the content toward user device 260 and/or customer edge device 270).

Ingress load balancer device 212 includes one or more devices capable of load balancing processing of content by one or more other devices of content ingress site 210. For example, ingress load balancer device 212 can include a load balancer, server device 222, and/or the like. In some implementations, ingress load balancer device 212 can receive, from segmenter devices 214, information related to processing of content by segmenter devices 214. Additionally, or alternatively, ingress load balancer device 212 can load balance processing of content among segmenter devices 214 (e.g., to prevent segmenter devices 214 from being overloaded, to fail over processing of content from a first segmenter device 214 to a second segmenter device 214, etc.).

Segmenter device 214 includes one or more devices capable of receiving, processing, providing, generating, and/or storing content received from CDN 280. For example, segmenter device 214 can include a segmenter, server device 222, and/or the like. In some implementations, segmenter device 214 can process content from CDN 280 into segments, portions, chunks, and/or the like (e.g., of a particular length for video content and/or audio content). Additionally, or alternatively, segmenter device 214 can provide processed content (e.g., chunks of content) to content distribution site 230 after processing the content.

Content repository 220 includes one or more sites and/or devices capable of receiving, providing, generating, processing, and/or storing content (e.g., on demand content, such as on demand video content). For example, content repository 220 can include a data center, a data warehouse, a set of server devices 222, and/or the like. In some implementations, content repository 220 can store content to be provided to user device 260 and/or customer edge device 270 (e.g., on demand content). Additionally, or alternatively, content repository 220 can provide content to content distribution site 230 based on receiving a request for the content, at a pre-determined time, and/or the like.

Server device 222 includes one or more devices capable of receiving, providing, storing, processing, and/or generating content (e.g., on demand content). For example, server device 222 can include a server (e.g., in a data center or a cloud computing environment), a data center (e.g., a multi-server micro data center), a workstation computer, a virtual machine (VM) provided in a cloud computing environment, or a similar type of device. In some implementations, server device 222 can include a communication interface that allows server device 222 to receive information from and/or transmit information to another device in environment 200. In some implementations, server device 222 can store content to be provided to user device 260 and/or customer edge device 270. Additionally, or alternatively, server device 222 can provide, to content distribution site 230, content stored by server device 222.

Content distribution site 230 includes one or more sites and/or devices capable of receiving, providing, storing, processing, and/or generating content. For example, content distribution site 230 can include a content point of distribution, a market center headend, a data center, and/or the like. In some implementations, content distribution site 230 can receive content from content ingress site 210 and/or content repository 220 (e.g., segments of content) and can encode the content. Additionally, or alternatively, content distribution site 230 can provide the content (e.g., encoded content) to content satellite office 240 and/or content cache 250.

Director device 232 includes one or more devices capable of managing operations of one or more other devices of content distribution site 230. For example, director device 232 can include a director, server device 222, and/or the like. In some implementations, director device 232 can provide, to one or more other devices of content distribution site 230, instructions related to processing (e.g., encoding) content from content ingress site 210 and/or content repository 220. Additionally, or alternatively, director device 232 can cause processing of content to fail over among devices of content distribution site 230 and/or among content distribution sites 230 (e.g., by providing a set of instructions to cause the failover).

Distribution load balancer device 234 includes one or more devices capable of load balancing processing of content by one or more other devices of content distribution site 230. For example, distribution load balancer device 234 can include a load balancer, server device 222, and/or the like. In some implementations, distribution load balancer device 234 can receive, from encoder devices 236 and/or streamer devices 238, information related to processing of content by encoder devices 236 and/or streamer devices 238. Additionally, or alternatively, distribution load balancer device 234 can load balance processing of content among encoder devices 236 and/or streamer devices 238 (e.g., to prevent encoder devices 236 and/or streamer devices 238 from being overloaded, to fail over processing of content from a first encoder device 236 and/or streamer device 238 to a second encoder device 236 and/or streamer device 238, etc.).

Encoder device 236 includes one or more devices capable of processing content. For example, encoder device 236 can include an encoder, an on demand content encoder, server device 222, and/or the like. In some implementations, encoder device 236 can encode content from content ingress site 210 (e.g., chunks of content). Additionally, or alternatively, encoder device 236 can provide content to streamer device 238 after processing the content.

Streamer device 238 includes one or more devices capable of providing content to one or more other devices. For example, streamer device 238 can include a streamer, server device 222, and/or the like. In some implementations, streamer device 238 can provide (e.g., stream) content to content satellite office 240 to facilitate providing of the content to user device 260 and/or customer edge device 270. Additionally, or alternatively, streamer device 238 can provide content to content cache 250 (e.g., for storage by origin server device 252).

Content satellite office 240 includes one or more sites and/or devices capable of providing content toward a destination (e.g., user device 260 and/or customer edge device 270). For example, content satellite office 240 can include a video satellite office, a hub, a data center, and/or the like. In some implementations, content satellite office 240 can be located in a geographic region and can receive content destined for homes in the same geographic region as content satellite office 240. Additionally, or alternatively, content satellite office 240 can provide, to one or more homes, content received from content distribution site 230 and/or content cache 250.

Repeater device 242 includes one or more devices capable of receiving, providing, storing, generating, and/or processing content to be provided to user device 260 and/or customer edge device 270. For example, repeater device 242 can include a repeater, a transceiver (or separate transmitter and receiver), an amplifier, server device 222, and/or a similar type of device. In some implementations, repeater device 242 can receive content from content satellite office 240 and/or content cache 250. Additionally, or alternatively, repeater device 242 can perform an action related to recovering lost content (e.g., due to packet loss, interference, etc.), lookback recording, inserting advertisements into content (e.g., ad splicing), multicast re-streaming, and/or the like.

Cache node 244 includes one or more devices capable of receiving, providing, storing, generating, and/or processing content to be provided to user device 260 and/or customer edge device 270. For example, cache node 244 can include a cache, an edge cache node, server device 222, and/or the like. In some implementations, cache node 244 can store content, from content distribution site 230 and/or content cache 250, for an amount of time (e.g., to reduce latency between a request for the content from user device 260 and/or customer edge device 270 and delivery of the content to user device 260 and/or customer edge device 270). Additionally, or alternatively, cache node 244 can store content to facilitate various content-related services for user device 260 and/or customer edge device 270, such as restart services (e.g., where a user of user device 260 and/or customer edge device 270 can restart live and/or on demand content), lookback services (e.g., where a user of user device 260 and/or customer edge device 270 can time-shift content from a scheduled time to another time), replay services (e.g., where a user of user device 260 and/or customer edge device 270 can replay previously aired content), and/or the like.

Network device 246 includes one or more devices (e.g., one or more traffic transfer devices) capable of receiving, providing, generating, storing, and/or processing information related to content provided to user device 260 and/or customer edge device 270. For example, network device 246 can include a firewall, a router, a gateway, a switch, a hub, a bridge, a reverse proxy, a server (e.g., a proxy server), a security device, an intrusion detection device, a load balancer, and/or a similar device. In some implementations, network device 246 can receive content to be delivered to user device 260 and/or customer edge device 270 (e.g., from cache node 244 and/or repeater device 242). Additionally, or alternatively, network device 246 can provide content toward user device 260 and/or customer edge device 270 (e.g., via an optical line terminal (OLT) associated with content satellite office 240, a network terminal, such as an optical network terminal (ONT) associated with a home, etc.).

Content cache 250 includes one or more sites and/or devices capable of receiving, providing, storing, generating, and/or processing content to be provided to user device 260 and/or customer edge device 270. For example, content cache 250 can include a data center (e.g., in a cloud computing environment), a data warehouse, a set of server devices 222, a set of origin server devices 252, and/or the like. In some implementations, content cache 250 can receive content from content distribution site 230. Additionally, or alternatively, content cache 250 can store content (e.g., on demand content) for an amount of time to reduce latency between a request for the content from user device 260 and/or customer edge device 270 and delivery of the content to user device 260 and/or customer edge device 270.

Origin server device 252 includes one or more devices capable of receiving, providing, storing, processing, and/or generating information related to content to be provided to user device 260 and/or customer edge device 270. For example, origin server device 252 can include server devices 222, a storage device, a content origin server, and/or the like. In some implementations, origin server device 252 can receive, from streamer device 238, content to be provided to user device 260 and/or customer edge device 270. Additionally, or alternatively, origin server device 252 can store content to be provided to user device 260 and/or customer edge device 270 and/or can provide the content to cache node 244.

User device 260 includes one or more devices capable of receiving, generating, providing, storing, and/or processing content. For example, user device 260 can include a desktop computer, a mobile phone (e.g., a smartphone, a radio telephone, etc.), a laptop computer, a tablet computer, a handheld computer, a gaming device, a wearable communication device (e.g., a smart wristwatch, a pair of smart eyeglasses, etc.), or a similar device. In some implementations, user device 260 can receive content from content satellite office 240 (e.g., via network 290). Additionally, or alternatively, user device 260 can provide content for output (e.g., via an output component associated with user device 260).

Customer edge device 270 includes one or more devices capable of receiving, generating, storing, processing, and/or providing content. For example, customer edge device 270 can include a set-top box, a television (e.g., an IP television), a projector, a modem, a smart speaker, an intelligent personal assistant device, and/or a similar device. In some implementations, customer edge device 270 can receive content from content satellite office 240 (e.g., via network 290). Additionally, or alternatively, customer edge device 270 can provide content for output (e.g., via an output component of customer edge device 270).

CDN 280 includes one or more wired and/or wireless networks. For example, CDN 280 can include a content delivery network, a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, CDN 280 can provide content to content ingress site 210.

Network 290 includes one or more wired and/or wireless networks. For example, network 290 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

In some implementations, one or more devices of environment 200 can be implemented as a virtual device (e.g., hosted on another device). Additionally, or alternatively, one or more devices of environment 200 can be implemented as physical device (e.g., on a rack of a data center).

Figure 3:
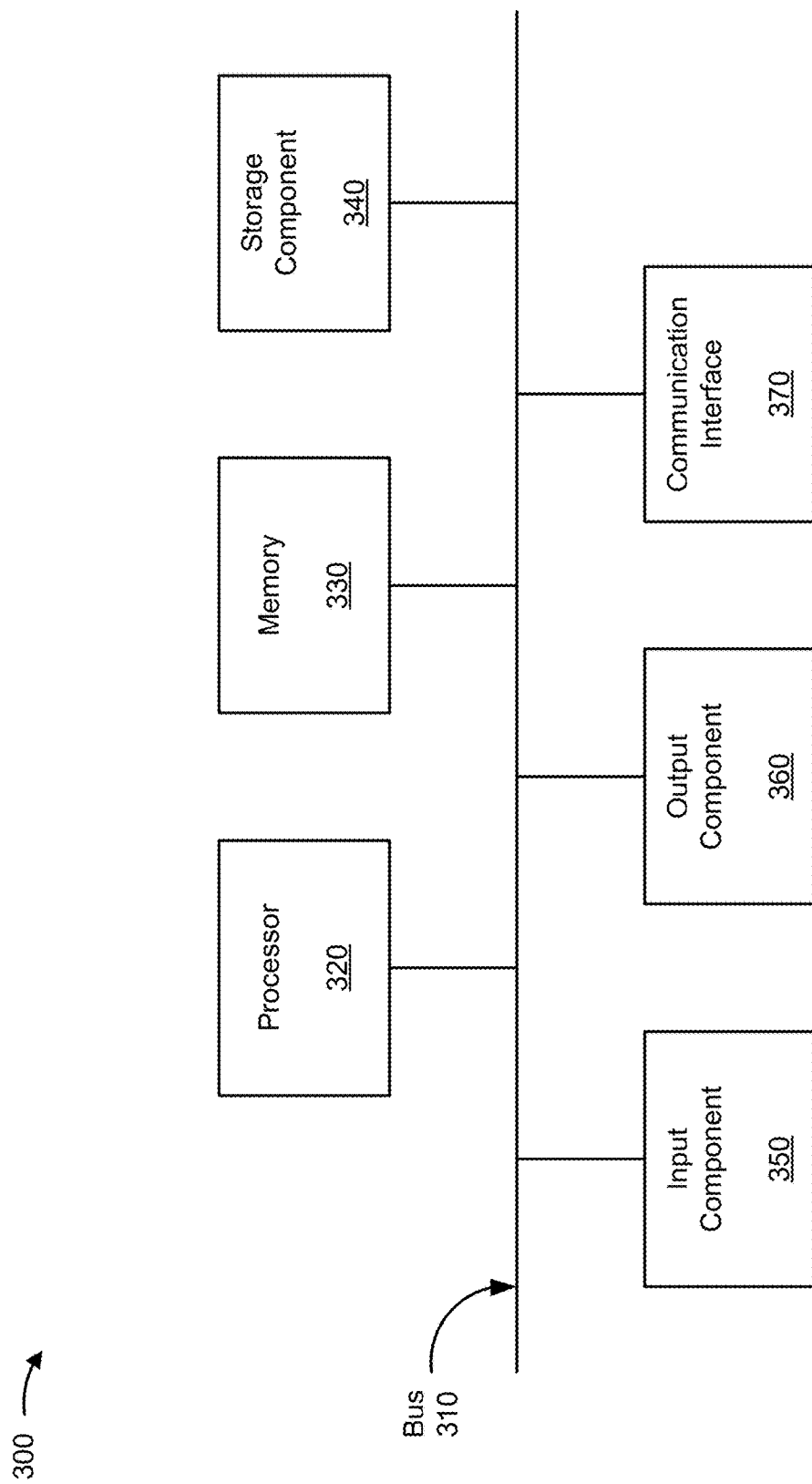
FIG. 3 is a diagram of example components of one or more devices of FIG. 2.

FIG. 3 is a diagram of example components of a device 300. Device 300 can correspond to content ingress site 210, ingress load balancer device 212, segmenter device 214, content repository 220, server device 222, content distribution site 230, director device 232, distribution load balancer device 234, encoder device 236, streamer device 238, content satellite office 240, repeater device 242, cache node 244, network device 246, content cache 250, origin server device 252, user device 260, and/or customer edge device 270. In some implementations, content ingress site 210, ingress load balancer device 212, segmenter device 214, content repository 220, server device 222, content distribution site 230, director device 232, distribution load balancer device 234, encoder device 236, streamer device 238, content satellite office 240, repeater device 242, cache node 244, network device 246, content cache 250, origin server device 252, user device 260, and/or customer edge device 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 related to a content stream integrity and redundancy system. For example, FIG. 4 shows an example of a failover among multiple streamer devices 238 and/or multiple content distribution sites 230. In some implementations, one or more process blocks of FIG. 4 can be performed by content distribution site 230. In some implementations, one or more process blocks of FIG. 4 can be performed by another device or a group of devices separate from or including content distribution site 230, such as content ingress site 210, ingress load balancer device 212, segmenter device 214, content repository 220, server device 222, director device 232, distribution load balancer device 234, encoder device 236, streamer device 238, content satellite office 240, repeater device 242, cache node 244, network device 246, content cache 250, origin server device 252, user device 260, and customer edge device 270.

As shown in FIG. 4, process 400 can include detecting that a streamer device associated with a content distribution site and/or the content distribution site is failing to provide content to a repeater device and/or is failing to provide the content at a threshold level of quality (block 410). For example, content distribution site 230 (e.g., a processor 320 of director device 232 associated with content distribution site 230) can detect that streamer device 238 associated with content distribution site 230 and/or content distribution site 230 is failing to provide content to repeater device 242 and/or is failing to provide the content at a threshold level of quality.

In some implementations, content distribution site 230 can receive data from streamer device 238 and/or repeater device 242 that identifies content being processed, segments of content generated from the content, packets provided toward user device 260 and/or customer edge device 270, packets received by repeater device 242 and/or another destination, whether packets are lost between streamer device 238 and repeater device 242, and/or the like. For example, content distribution site 230 can receive the data as content is being provided to repeater device 242 and/or is being received by repeater device 242 (e.g., in real-time or near real-time), according to a schedule, periodically, based on requesting the data, and/or the like.

In some implementations, content can include video, audio, text, an image, and/or the like. In some implementations, content can include live content (e.g., live video, provided in real-time or near real-time), content on demand (e.g., video on demand, games on demand, etc.), and/or the like. In some implementations, content can be transmitted using one or more packets. In some implementations, a packet can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via CDN 280 and/or network 290. In some implementations, a portion of content can include a segment, a chunk, and/or the like.

In some implementations, a level of quality can refer to a quality of content provided to repeater device 242 from streamer device 238. In some implementations, an error in content provided to repeater device 242 and/or data related to the content can negatively impact a level of quality of the content. For example, an error can include dropped packets, a bit rate error (e.g., that satisfies a threshold), content at a different resolution than expected, and/or the like.

In some implementations, content distribution site 230 can detect that content distribution site 230 and/or streamer device 238 associated with content distribution site 230 is failing to provide content to repeater device 242 and/or is failing to provide the content at a threshold level of quality based on the received data. For example, content distribution site 230 can determine that a quantity of packets provided to repeater device 242 does not match a quantity of packets received by repeater device 242. In this case, the mismatch in the quantity of packets can indicate a failure to provide content to repeater device 242, a failure to provide the packets at a threshold level of quality (e.g., the quantity of lost packets can satisfy a threshold, such that the lost packets cause interruptions to the content when provided for display), and/or the like.

In some implementations, content distribution site 230 can detect that content distribution site 230 and/or streamer device 238 associated with content distribution site 230 is failing to provide content to repeater device 242, and/or is failing to provide the content at a threshold level of quality, based on monitoring data related to the content, processing the data, and/or the like. For example, content distribution site 230 can monitor the data as the data is received in real-time or near real-time and can determine that the content is not being provided to repeater device 242 and/or being provided at a threshold level of quality (e.g., based on identifying that data related to the content was lost, that content was not provided at a threshold resolution, that data related to content included a threshold bit rate error, etc.). Additionally, or alternatively, and as another example, content distribution site 230 can process data related to content provided during a particular time period (e.g., historical data) to determine that content has not been provided to repeater device 242 and/or at a threshold level of quality during the particular time period.

In this way, content distribution site 230 can detect that streamer device 238 and/or content distribution site 230 is failing to provide content (and/or at a threshold level of quality) prior to determining that the content is to be provided by another steamer device 238 and/or another content distribution site 230.

As further shown in FIG. 4, process 400 can include determining that the content is to be provided by another streamer device of the content distribution site and/or by another content distribution site (block 420). For example, content distribution site 230 (e.g., a processor 320 of director device 232 of content distribution site 230) can determine that the content is to be provided by another streamer device 238 of content distribution site 230 and/or by another content distribution site 230 (e.g., another streamer device 238 of another content distribution site 230).

In some implementations, content distribution site 230 can determine that content provided by a particular streamer device 238 and/or by a particular content distribution site 230 is to be provided by another streamer device 238 and/or another content distribution site 230 based on data related to content. For example, content distribution site 230 can determine that content is to be provided by another streamer device 238 and/or another content distribution site 230 based on data related to the content indicating that a particular streamer device 238 and/or a particular content distribution site 230 is failing to provide the content and/or is failing to provide the content at a threshold level of quality, that the data includes a threshold quantity of errors, that the data includes a particular error, and/or the like.

For example, content distribution site 230 can determine that data related to the content includes a bit rate error that satisfies a threshold. In this case, content distribution site 230 can determine that the content is to be provided by another streamer device 238 and/or another content distribution site 230 based on the data including a bit rate error that satisfies a threshold. Additionally, or alternatively, and as another example, content distribution site 230 can determine that a particular streamer device 238 and/or a particular content distribution site 230 is providing content at a different resolution than expected (e.g., is providing content at a standard definition resolution when a high definition resolution is expected). In this case, content distribution site 230 can determine that another streamer device 238 and/or another content distribution site 230 is to provide the content based on the data indicating that the particular streamer device 238 and/or the particular content distribution site 230 is providing the content at a different resolution than expected.

In some implementations, content distribution site 230 can identify another content distribution site 230 and/or another streamer device 238 to provide the content. For example, content distribution site 230 can identify a properly functioning content distribution site 230 and/or streamer device 238 to provide the content. For example, content distribution site 230 can identify another content distribution site 230 and/or another streamer device 238 that is providing content, that is providing content without an error, that is providing content without the same error as a particular content distribution site 230 and/or a particular streamer device 238 that was originally providing the content, and/or the like. Additionally, or alternatively, content distribution site 230 can identify another content distribution site 230 and/or another streamer device 238 that has a connection to repeater device 242 to provide the content (e.g., when a connection is causing content to not be provided to repeater device 242 and/or at a threshold level of quality).

In some implementations, content distribution site 230 can determine whether another streamer device 238 associated with content distribution site 230 or another content distribution site 230 (e.g., another streamer device 238 associated with the other content distribution site 230) is to provide content. For example, content distribution site 230 can determine that another streamer device 238 associated with content distribution site 230 is to provide content based on a threshold quantity of other streamer devices 238 associated with content distribution site 230 being available, based on streamer devices 238 associated with content distribution site 230 having a threshold amount of available processing capacity, based on an error related to content being caused by a connection with a particular streamer device 238 rather than with content distribution site 230, and/or the like. Conversely, and as another example, content distribution site 230 can determine that another content distribution site 230 (e.g., another streamer device 238 associated with the other content distribution site 230) is to provide content based on streamer devices 238 associated with content distribution site 230 not having a threshold amount of available processing capacity, based on a connection between content distribution site 230 and repeater device 242 causing an error related to the content, based on content distribution site 230 not being associated with a threshold quantity of available streamer devices 238, and/or the like.

In some implementations, content distribution sites 230 can exchange health information to inform each other of a status of the content distribution sites 230 (e.g., whether available or unavailable, an available processing capacity, etc.). For example, content distribution sites 230 can exchange health information periodically, according to a schedule, and/or the like.

In this way, content distribution site 230 can determine that the content is to be provided by another streamer device 238 and/or another content distribution site 230 prior to performing an action to cause the other streamer device 238 and/or the other content distribution site 230 to provide the content.

As further shown in FIG. 4, process 400 can include performing an action to cause the other streamer device and/or the other content distribution site to provide the content (block 430). For example, content distribution site 230 (e.g., a processor 320 of director device 232 of content distribution site 230) can perform an action to cause the other streamer device 238 and/or the other content distribution site 230 to provide the content.

In some implementations, content distribution site 230 can perform an action to provide, to repeater device 242 of content satellite office 240, information identifying that another streamer device 238 and/or another content distribution site 230 is to provide the content. Additionally, or alternatively, content distribution site 230 can perform an action to power on another streamer device 238 that is to provide content, and/or an action to power down streamer device 238 that will no longer provide the content. Additionally, or alternatively, content distribution site 230 can perform an action to bring another content distribution site 230 online and/or to cause content distribution site 230 to be offline.

Additionally, or alternatively, content distribution site 230 can perform an action to send a message to user device 260 associated with a network administrator to identify that content is to be provided by another content distribution site 230 and/or another streamer device 238. Additionally, or alternatively, content distribution site 230 can perform an action to generate a work ticket for streamer device 238 and/or content distribution site 230 that is experiencing errors. Additionally, or alternatively, content distribution site 230 can automatically troubleshoot an error. Additionally, or alternatively, content distribution site 230 can automatically reboot. Additionally, or alternatively, content distribution site 230 can automatically order a replacement device or part.

In this way, content distribution site 230 can perform an action to cause the other streamer device 238 and/or the other content distribution site 230 to provide the content.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5A:
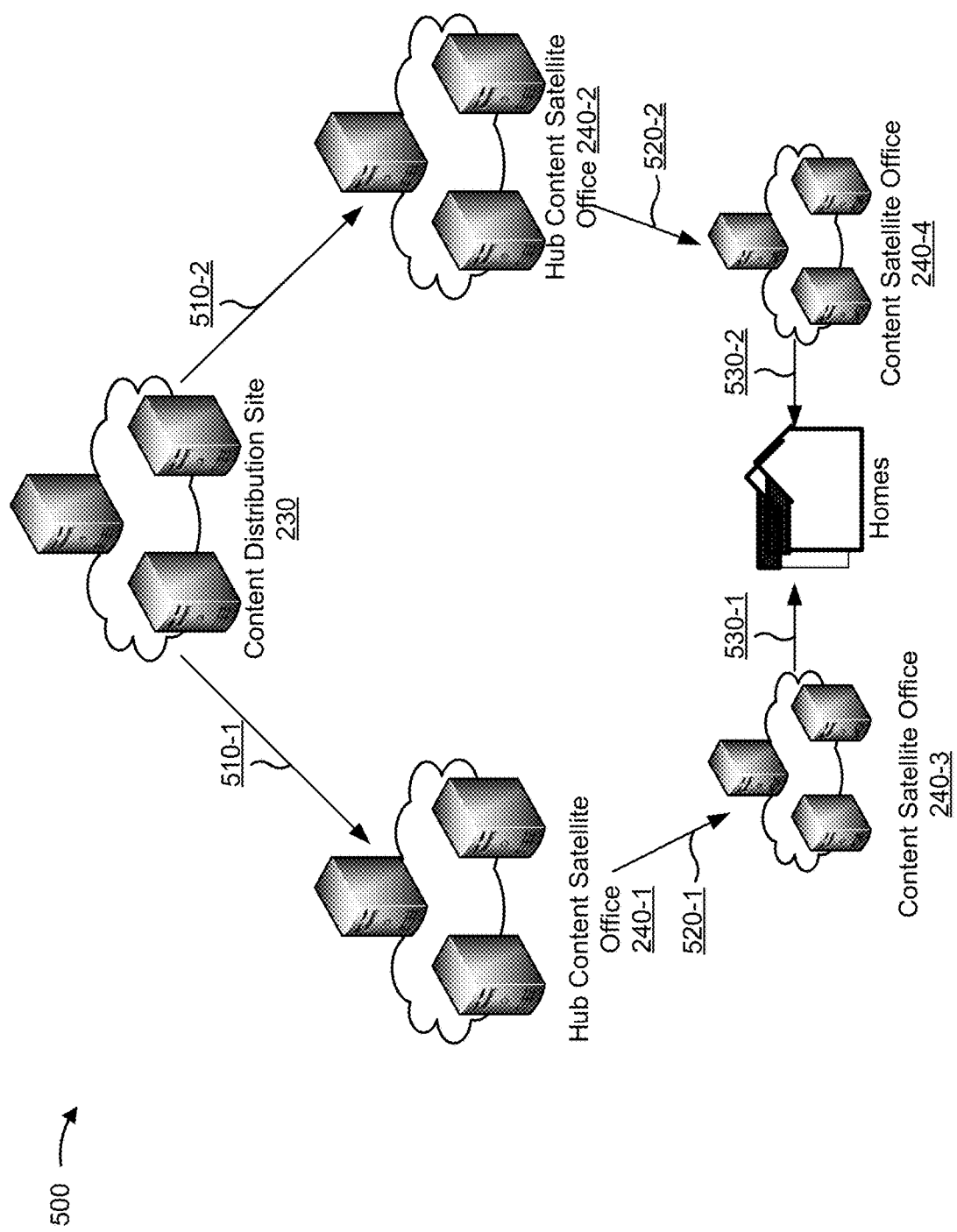
FIGS. 5A and 5B are diagrams of an example implementation related to a content stream integrity and redundancy system.
Figure 5B:
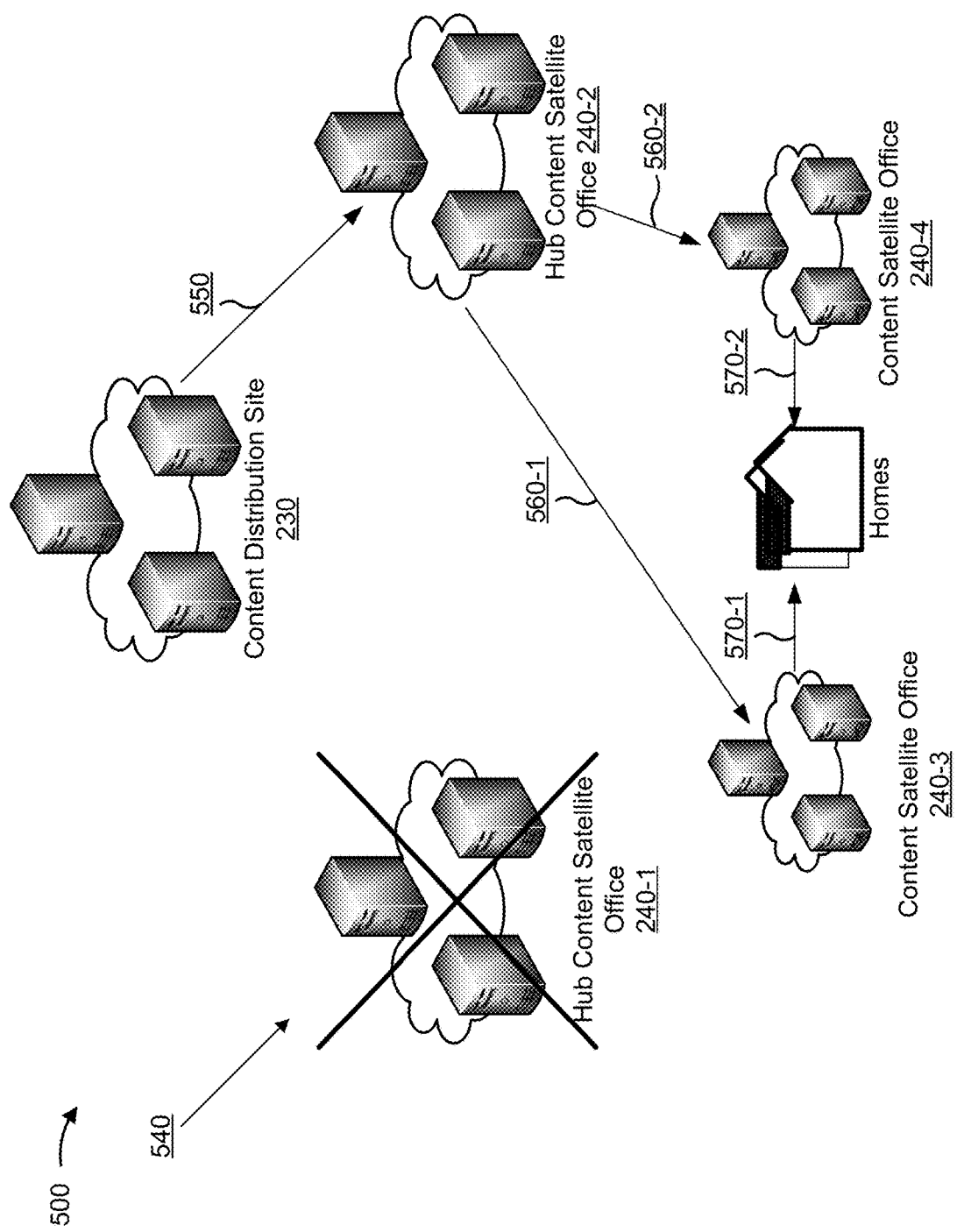

FIGS. 5A and 5B are diagrams of an example implementation 500 related to example process 400 shown in FIG. 4. For example, FIGS. 5A and 5B show an example of a failover between hub content satellite offices 240. As shown in FIG. 5A, example implementation 500 can include content distribution site 230, multiple hub content satellite offices 240-1 and 240-2 (e.g., each corresponding to a respective geographic region), multiple non-hub content satellite offices 240-3 and 240-4 (e.g., each corresponding to a respective location within a geographic region, such as a city, a state, etc.), and homes that include devices for which content is destined (e.g., customer edge devices 270 or user devices 260).

As further shown in FIG. 5A, and as shown by reference numbers 510-1 and 510-2, content distribution site 230 can provide content to either hub content satellite office 240-1 or 240-2 (or both hub content satellite offices 240-1 and 240-2). As an example, assume that hub content satellite offices 240-1 and 240-2 are initially operational and functioning normally. In this case, as shown by reference numbers 520-1 and 520-2, hub content satellite office 240-1 can provide content to non-hub content satellite office 240-3, and hub content satellite office 240-2 can provide content to non-hub content satellite office 240-4. As shown by reference numbers 530-1 and 530-2, non-hub content satellite offices 240-3 and 240-4 can provide the content to the homes (e.g., for display via corresponding customer edge devices 270 and/or user devices 260).

As shown in FIG. 5B, and as shown by reference number 540, assume that hub content satellite office 240-1 has become unavailable (e.g., due to a failure of the entire hub content satellite office 240-1, a failure of a particular repeater device 242 associated with hub content satellite office 240-1, etc.). As shown by reference number 550, content distribution site 230 can begin to provide, to hub content satellite office 240-2, the content that would normally have been destined for hub content satellite office 240-1, and can continue to provide the content that is destined for hub content satellite office 240-2, to hub content satellite office 240-2. In other words, hub content satellite office 240-1 can fail over to hub content satellite office 240-2 (e.g., the entire hub content satellite office 240-1 can fail over to hub content satellite office 240-2). Additionally, or alternatively, a particular repeater device 242 of hub content satellite office 240-1 can fail over to another repeater device 242 of hub content satellite office 240-2.

In this way, a system can provide network redundancy between hub content satellite offices 240, which allows content to automatically and quickly fail over if a hub content satellite office 240 becomes unavailable due to a failure of the hub content satellite office 240 or a failure of a device (e.g., repeater device 242) associated with the hub content satellite office 240.

As further shown in FIG. 5B, and as shown by reference numbers 560-1 and 560-2, hub content satellite office 240-2 can provide the content that was originally destined for non-hub content satellite office 240-3 to non-hub content satellite office 240-3, and can provide the content that was originally destined for non-hub content satellite office 240-4 to non-hub content satellite office 240-4. As shown by reference numbers 570-1 and 570-2, non-hub content satellite offices 240-3 and 240-4 can provide the content to the homes. In some implementations, upon hub content satellite office 240-1 becoming available again, content distribution site 230 can provide content to both hub content satellite office 240-1 and hub content satellite office 240-2, in a manner similar to that which was described with regard to FIG. 5A.

In this way, an entire hub content satellite office 240 of a system can become unavailable without reducing a capability of the system to provide the content to an intended destination. This provides system redundancy, thereby reducing or eliminating interruptions to providing content to a destination.

As indicated above, FIGS. 5A and 5B are provided merely as an example. Other examples are possible and can differ from what was described with regard to FIGS. 5A and 5B. For example, although described with regard to content satellite office 240, the implementations described with respect to FIGS. 5A and 5B apply equally to content ingress site 210, content repository 220, content distribution site 230, and/or content cache 250.

In this way, a system can provide quick and automatic failover when a device experiences an error via use of IP spoofing. This reduces latency related to a failover from a first device to a second device. In addition, this conserves processing resources related to a failover by reducing or eliminating a need for a device to be reconfigured to fail over to another device. Further, this improves delivery of content via the system by reducing latency related to providing the content when a portion of the system experiences an error.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
a plurality of content distribution sites to provide content to one or more content satellite offices,
the plurality of content distribution sites comprising a plurality of streamer devices,
the plurality of streamer devices being configured to provide content with forward error correction (FEC) to one or more repeater devices,
the one or more repeater devices being subscribed to a multicast group associated with the plurality of streamer devices, and
the one or more content satellite offices including the one or more repeater devices,
wherein a repeater device, of the one or more repeater devices, being configured to use the FEC to fix an error associated with the content received from one or more of the plurality of streamer devices.

2. The system of claim 1, where the multicast group is associated with a spoofed Internet protocol (IP) address associated with the plurality of streamer devices within the plurality of content distribution sites.

3. The system of claim 1, where the multicast group is to facilitate a failover among the plurality of streamer devices.

4. The system of claim 1, where the plurality of streamer devices within the plurality of content distribution sites are associated with a spoofed Internet protocol (IP) address,
the spoofed IP address to facilitate failover among the plurality of streamer devices,
the one or more repeater devices sending multicast join requests to the plurality of streamer devices to subscribe to the content provided by the plurality of streamer devices.

5. The system of claim 1, where the one or more repeater devices generate data related to the content that is lost during transmission from a streamer device, of the plurality of streamer devices.

6. The system of claim 1, where the repeater device is to send a multicast join request to the multicast group to subscribe to the content provided by the multicast group.

7. The system of claim 1, where a first streamer device, of the plurality of streamer devices, is to fail over to a second streamer device of the plurality of streamer devices,
the second streamer device to provide the content previously provided by the first streamer device to the multicast group.

8. A content delivery system comprising:
a content distribution site to provide content to one or more content satellite offices,
a plurality of streamer devices within the content distribution site,
the plurality of streamer devices being configured to provide the content with forward error correction (FEC) to a repeater device that has subscribed to a group associated with the content distribution site; and
the one or more content satellite offices including the repeater device,
the repeater device being configured to use the FEC to fix an error associated with the content received from one or more of the plurality of streamer devices.

9. The content delivery system of claim 8, where the repeater device performs an action related to recovering lost content,
the action being one or more of:
lookback recording,
inserting advertisements into the content, or
multicast re-streaming.

10. The content delivery system of claim 8, where the repeater device is to send a multicast join request to the group to subscribe to the content provided by the group.

11. The content delivery system of claim 8, where the group is associated with a spoofed Internet protocol (IP) address associated with the plurality of streamer devices within the content distribution site.

12. The content delivery system of claim 8, where the group is to facilitate a failover among the plurality of streamer devices.

13. The content delivery system of claim 8, where a first streamer device, of the plurality of streamer devices, is to fail over to a second streamer device of the plurality of streamer devices,
the second streamer device to provide the content previously provided by the first streamer device to the group.

14. The content delivery system of claim 8, where the plurality of streamer devices within the content distribution site are associated with a spoofed Internet protocol (IP) address,
the spoofed IP address to facilitate failover among the plurality of streamer devices.

15. A method, comprising:
receiving, by one or more devices, content from a streamer device associated with a plurality of streamer devices in a content distribution site,
the one or more devices including a plurality of content satellite offices,
a content satellite office, of the plurality of content satellite offices, including one or more repeater devices, and
the plurality of streamer devices being configured to provide the content with forward error correction (FEC) to the one or more repeater devices that have subscribed to a multicast group associated with the plurality of streamer devices;
fixing, by the one or more devices, the content received from one or more of the plurality of streamer devices using the FEC,
the one or more devices further including the one or more repeater devices; and
providing, by the one or more devices, the fixed content to a set of destination devices.

16. The method of claim 15, further comprising:
sending, by the one or more repeater devices, multicast join requests to the plurality of streamer devices to subscribe to the content provided by the plurality of streamer devices.

17. The method of claim 15, where the multicast group facilitates a failover among the plurality of streamer devices.

18. The method of claim 15, further comprising:
providing, by the plurality of streamer devices, the content to the one or more repeater devices after the one or more repeater devices have subscribed to the multicast group associated with a spoofed Internet protocol (IP) address.

19. The method of claim 15, further comprising:
failing over, by a first content satellite office of the plurality of content satellite offices, to a second content satellite office of the plurality of content satellite offices.

20. The method of claim 15, further comprising:
performing, by the one or more repeater devices, an action related to recovering lost content,
the action being one or more of:
lookback recording,
inserting advertisements into the content, or
multicast re-streaming.

* * * * *